UNITED STATES PATENT OFFICE.

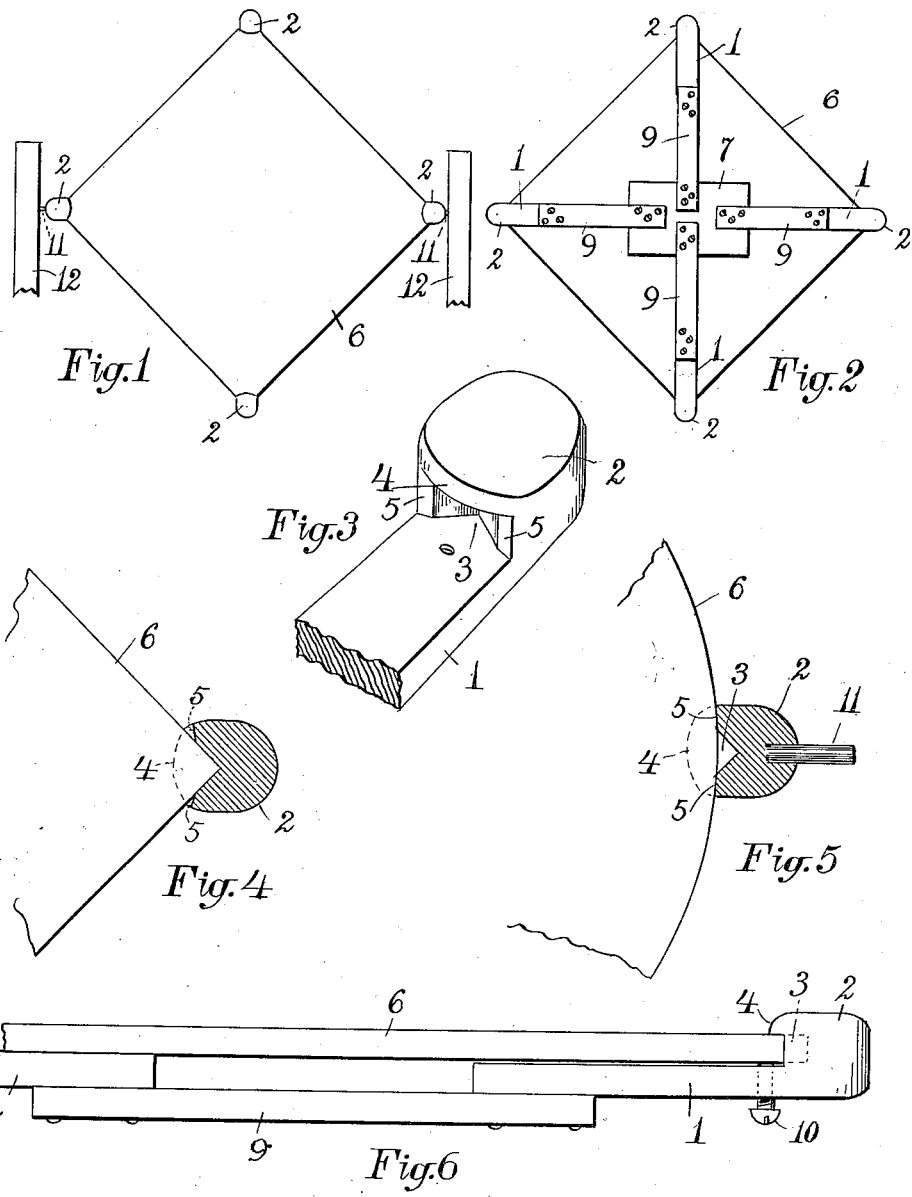

JOSEPH SARTORI, OF REVERE, MASSACHUSETTS.

HOLDER FOR MIRRORS AND THE LIKE.

1,076,237.  Specification of Letters Patent.  Patented Oct. 21, 1913.

Application filed November 10, 1911. Serial No. 659,550.

*To all whom it may concern:*

Be it known that I, JOSEPH SARTORI, a citizen of the United States, and a resident of Revere, in the county of Suffolk and Commonwealth of Massachusetts, have invented certain new and useful Improvements in Holders for Mirrors and the like, of which the following is a full and exact specification.

The object of this invention is the construction of a simple, inexpensive and effective frame or holder by means of which to support mirrors and other plates of glass.

Referring to the drawings forming part of this specification, Figure 1 is a front view of a rectangular mirror supported by my holder. Fig. 2 is a rear view of the same. Fig. 3 is a perspective view of the essential part of said holder. Fig. 4 is a sectional view of one of the holder elements shown supporting a rectangular mirror. Fig. 5 is a similar view showing a curved or circular mirror being supported. Fig. 6 is a side view of one of the holder-elements and an edge view of a plate of glass being held by the same.

One of the holder elements comprising my invention consists of an arm 1 (Fig. 3) having at its outer extremity a block or hand 2 having an angular recess 3 overhung by a lip 4. At each side of said recess is an abutment 5, also overhung by said lip. For a rectangular mirror, I use four of these holder-elements 2, one for each corner of the former; but for circular and elliptical mirrors, a larger or smaller number may be employed. Where the mirror 6 has no backing, I prefer to secure the holder elements together by means of a thin board 7 having strips 9 screwed or otherwise fastened thereto and to said arms, as shown in Figs. 2 and 6. The blocks or holder elements 2 are in this case arranged to embrace the corners of the mirror; said corners entering the recesses 3, as illustrated in Fig. 4, and consequently being held with all needed security; since said blocks are so tied together by the board 7 and strips 9 that there can be no disengagement between such corners and recesses. If the sheet of glass is thinner than the space between each arm 1 and its lip 4, then the screw 10 (Fig. 6) can be turned up until the glass is pressed snugly against said lip, and all rattle and displacement prevented. This is, in addition, needed as a matter of appearance, in order that there may be no space visible between the surface of the mirror and said lips.

When the mirror is round, its convex edge fits in beneath the arms 1 and lips 4 and rests against said ledges or abutments 5, as shown in Fig. 5. Said abutments being fitted to curved edges, and the rounded periphery of the mirror being beneath the lips 4, there is no danger of the glass plate's slipping out from the holder-elements, especially if a suitable number thereof is used. Where the mirror is to be connected with a dressing case, and is to be capable of being tipped in the usually desired manner, two opposite blocks 2 are suitably apertured, and pins or screws 11 are adapted to be seated therein, the latter being held by posts 12 or other structures rising from the dressing case or other article of furniture. See Fig. 1, and Fig. 5.

What I claim as my invention and for which I desire Letters Patent is as follows, to wit:

The combination with a mirror and the like, of a holder therefor comprising a plurality of blocks and means for fastening them together, said means extending over the back of such mirror, and each of said blocks being composed of fibrous material having a back portion contacting with the back of the mirror, a frontal portion or lip contacting with the face of the mirror, and a connecting portion between said back portion and frontal portion, said connecting portion comprising a recess having two angularly disposed faces laterally terminating in abutments, said recess being overhung by said frontal portion or lip.

In testimony that I claim the foregoing invention, I have hereunto set my hand this 8th day of November, 1911.

JOSEPH SARTORI.

Witnesses:
A. B. UPHAM,
OLCOTT O. PARTRIDGE.

---

Copies of this patent may be obtained for five cents each, by addressing the "Commissioner of Patents, Washington, D. C."